United States Patent

[11] 3,609,246

[72] Inventors Jean Jacques Muller Garches; Andre Jean Henquet, Boulogne/Seine; Pierre Maurice Commegrain, Montrouge, all of France
[21] Appl. No. 725,424
[22] Filed Apr. 30, 1968
[45] Patented Sept. 28, 1971
[73] Assignee International Standard Electric Corporation New York, N.Y.
[32] Priority May 5, 1967
[33] France
[31] P.V. 105 371

[54] RADIOTELEPHONE COMMUNICATION SYSTEM
7 Claims, 5 Drawing Figs.

[52] U.S. Cl. .......... 179/41 A
[51] Int. Cl. .......... H04q 7/00
[50] Field of Search .......... 179/41 A; 325/55, 64

[56] References Cited

UNITED STATES PATENTS

| | | | |
|---|---|---|---|
| 2,877,343 | 3/1959 | Mitchell | 325/64 |
| 3,041,402 | 6/1962 | Dimmer | 179/41 |

FOREIGN PATENTS

| | | | |
|---|---|---|---|
| 696,503 | 9/1953 | Great Britain | 179/41 A |

*Primary Examiner*—Kathleen H. Claffy
*Assistant Examiner*—Douglas W. Olms
*Attorneys*—C. Cornell Remsen, Jr., Rayson P. Morris, Percy P. Lantzy, J. Warren Whitesel and Delbert P. Warner

ABSTRACT: This system provides for automatic communications between the subscribers of public telephone networks and mobile sets over a large land area (or along a highway) covered by a plurality of radiotelephone exchanges. A call from a network exchange for a mobile is first transmitted to all these radio exchanges by a service-bus line. When one of the radio exchanges reaches the mobile in its area, it signals itself to the calling exchange and only then the calling exchange proceeds with the extension of the telephone toll connection to that radio exchange.

Figure 1:
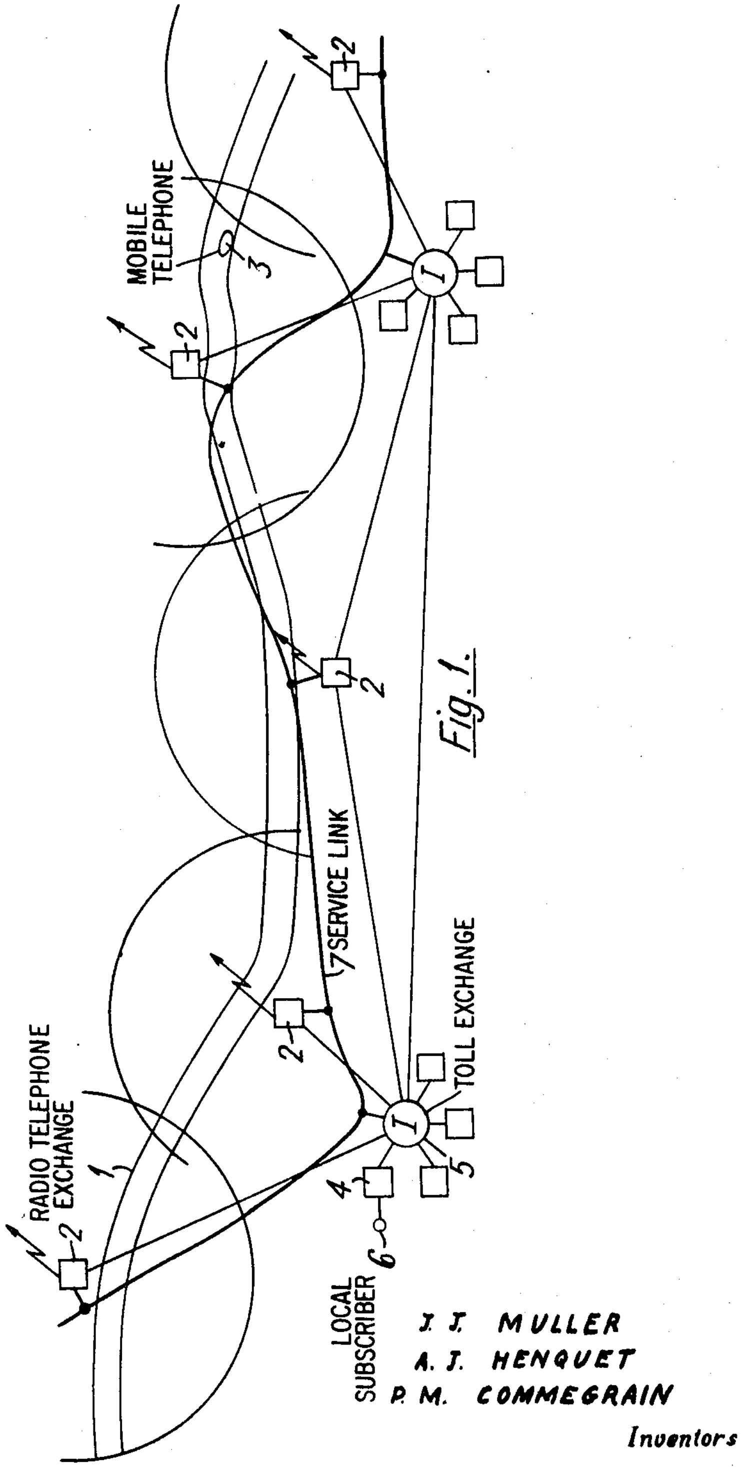

J. J. MULLER
A. J. HENQUET
P. M. COMMEGRAIN
*Inventors*

By O. G. Warner
*Attorney*

RADIOTELEPHONE COMMUNICATION SYSTEM

The present invention relates to radiotelephone communication systems. It relates, more especially, to a communication system between local or regional telephone networks, and mobile sets which can move from one point to another over a large land area, by means of toll exchanges associated to the said networks, and a plurality of radio telephone exchanges linked over a distance to these toll exchanges, said radiotelephone exchanges covering the said land area. By "radiotelephone" exchange is meant any telephone exchange equipped with a radiotelephone chain to radiotelephone communication with mobile sets within its range.

The first problem set by radiotelephone communications of this type is to establish a connection with a called mobile set without knowing in which radiotelephone area it is to be found. The second problem is to link up with this set rapidly. The third problem is how not to keep a telephone toll connection engaged before linking up with the called mobile set. The system of the invention offers suitable solutions to these problems. Moreover it is compatible with a service of simple call receivers, which are only adapted to detect a selective call and to signal it to the subscriber by an acoustics or a video device. As far as the mobile sets already mentioned are concerned, these are transceivers adapted to detect a selective call, to send back an "acknowledgement of receipt," to receive a ringing signal and to establish a call connection more especially a duplex communication.

This refers, here, to terminating or received calls for the mobile sets. The problems set by originating calls from these sets are different and will not be dealt with in the patent application.

According to a feature of the invention, a system of the type provided for comprises: (a) a link for transmission of service information, - such as a data transmission link - between the toll exchanges, on the one hand, and the radiotelephone exchanges, on the other, (b) means for connecting this transmission in parallel with the outgoing switching chain in toll exchanges, and with the incoming switching chain in radiotelephone exchanges; (c) means for sending out the number of a called mobile set via the link thus established, from the calling toll exchange to all radio telephone exchanges; (d) and means, in the latter to broadcast this number over their radiotelephone chain.

According to another feature of the invention, the system comprises, in addition to the said means: (e) means for transmitting switching informations, from the radiotelephone exchange which has received a reply (acknowledgment of receipt) from the called mobile set, to the calling toll exchange, via the same link connected as above; (f) and means in toll exchanges, to operate then their normal means for extending the telephone communication by the usual way of the outgoing switching chain in the calling exchange, to the answering radiotelephone exchange, and the incoming switching chain in the exchange.

The transmission link provided for here can be set up either in line, or loop, as required. It must comprise means whereby a toll exchange is adapted to send out a general call to the radiotelephone exchanges, and a radiotelephone exchange is adapted to direct its reply to the calling toll exchange. It also implies means to avoid mixing between the communications transmitted. There exist well-known transmission links comprising all such means, consequently the link provided for herein need not be described more fully.

According to a further feature of the invention, the system also access (g) means for linking the said transmission link, in toll exchanges, to an outgoing circuit which has access to the outgoing switching chain; (h) radiotelephone exchanges, means for connecting this link to an incoming circuit accessible from the incoming switching chain and for connecting this circuit to an input of the radiotelephone chain; (i) means for guarding the path established in the radiotelephone chain to reach the mobile set, after this set has replied; (j) and means, in these toll exchanges, for operating their normal means for extending the telephone communication from their said outgoing circuit, by the usual way of their outgoing switching chain, to the answering radiotelephone exchange, and from the incoming circuit, where this communication finds the path guarded in the radio telephone chain, up to the called mobile set. In the radio telephone chain, the path towards the mobile set is preferably in a ready-to-ring condition, and the ringing signal is sent to the mobile set as soon as the telephone communication has been extended to that path, as stated above.

Means can be provided for releasing the transmission link between the calling toll exchange and the radiotelephone exchanges after the number of the called station has been sent out when this number has been assigned to a simple call receiver.

Figure 3:
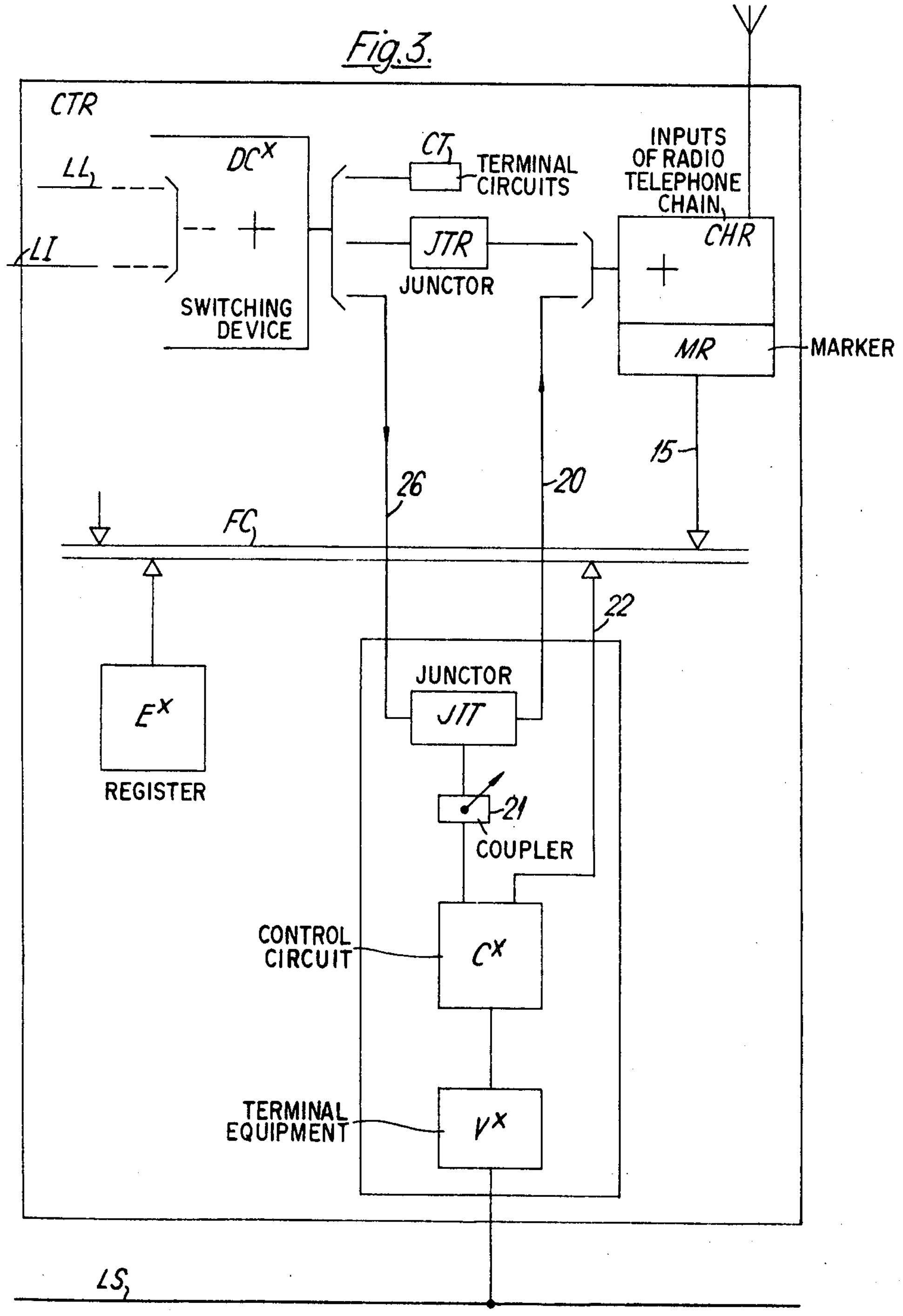
Figure 4:
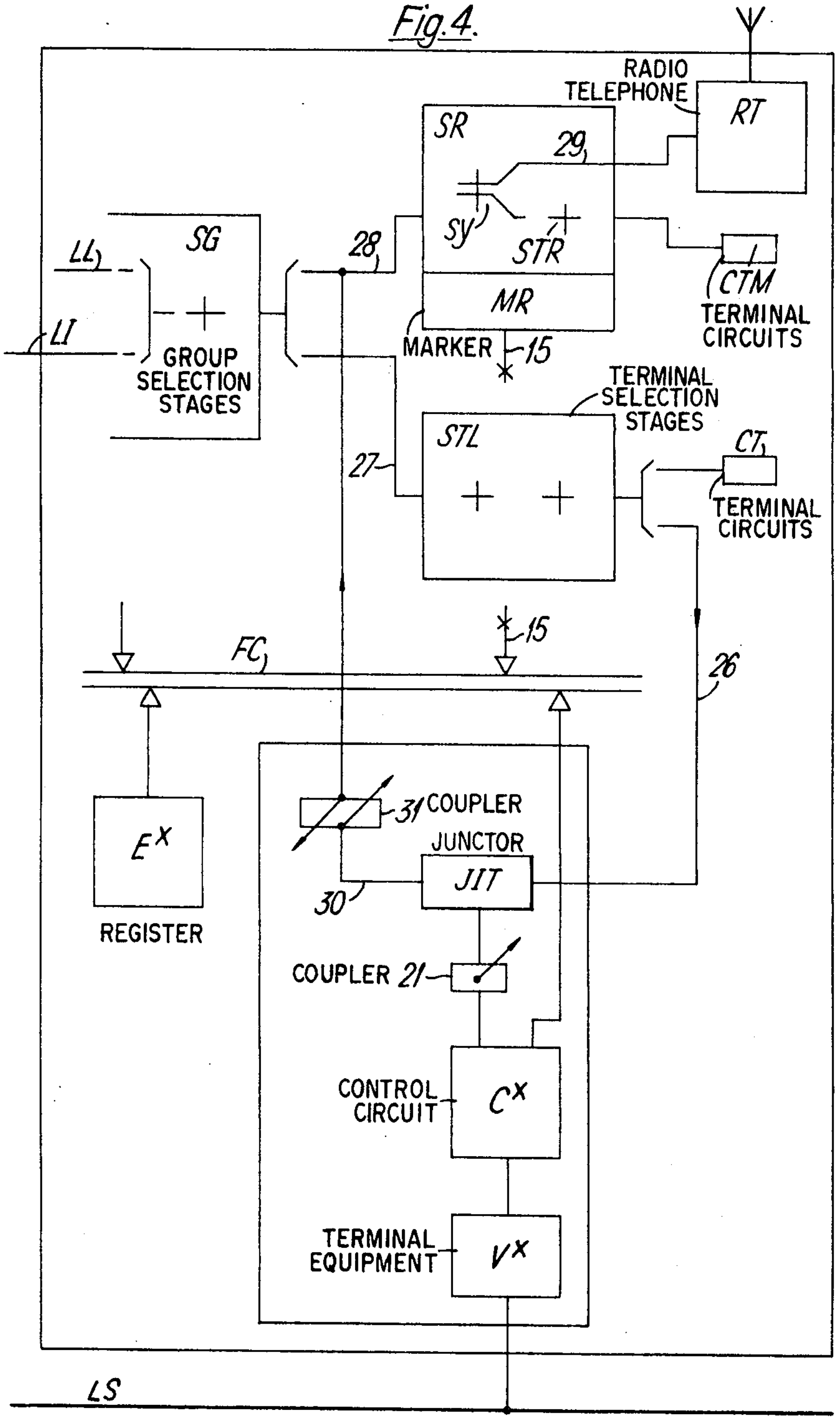

The invention will be described in more detail with reference to the appended drawing, in which;

FIG. 1 shows a radiotelephone link laid along a highway;

FIGS. *2a* and *2b* depict an organic diagram of a toll exchange and a radio telephone exchange respectively equipped according to the invention;

FIG. 3 shows a more accurate diagram, showing the equipment of a radiotelephone exchange in which the inputs of the radiotelephone chain are connected to the terminating outputs of the telephone-switching chain; and FIG. 4 shows a modification in which the radiotelephone chain inputs are connected to the outputs of a group selection stage in the telephone-switching chain.

FIG. 1 shows the system of the invention in a case where the radiotelephone link has to cover a highway 1. Radio coverage is provided by a chain of radiotelephone exchanges 2 suitably located along the highway 1. Exchanges 2 are telephone exchanges selected for their geographic location and completed with radiotelephone equipment. Their switching networks may differ, and some may even be manual. Telephone calls to mobile stations, such as a car 3, may come from city or area telephone networks comprising local telephone exchanges served by a toll exchange 5. A local subscriber set appears in 6. It is assumed that all toll centers 5 can reach all radiotelephone exchanges 2 via ordinary toll connections, either directly or through other toll exchanges, as shown in the drawing. Some networks or local telephone exchanges may use simple automatic or manual toll services: in this case, the term "toll exchange" must be understood as applying to such services.

The system of the invention must allow to reach a called mobile subscriber set, the geographical location of which unknown, to locate it in the area of one of the radiotelephone exchanges and to establish a toll link with the said exchange. These results are obtained, according to the invention, by means of a service link 7 between these toll exchanges 5 and the radiotelephone exchanges 2. In this example, this link is line shaped but it can also take the shape of a loop or of a network, depending on the shape of the geographic area to be covered. This link is used for calling the mobile set while sending out its number, from the calling toll exchange, to all the radiotelephone exchanges; and to direct a reply to this toll exchange, from the radiotelephone exchange which will have located the mobile set in its area. The calling toll exchange then establishes an ordinary toll link with the answering exchange, from the information contained in the reply, just as it would if it had received the called number in an incoming trunk call.

Service link 7 may be a suitable link, of the type used for information or data transmission is press services, seat reservation, and so on. The equipment of this link will allow each toll exchange 5 to seize a transmission path and send out information (mainly the number of the called mobile set) to all radiotelephone exchanges in the chain 2. It must then enable any radiotelephone exchange (the one which has reached the mobile set) to direct information (mainly its own identity) to the calling toll exchange. This operation can be achieved by means which are well known in transmission systems of the type mentioned.

Service link 7 can be released when the calling exchange has received a reply. In a case where the called number represents a simple call receiver, link 7 can be released as soon as the called number has been sent out to the radiotelephone exchanges.

The system according to the invention can be adapted to various operation processes and operating methods and to various switching chains in radiotelephone exchanges. The following instances are of particular interest:

1. Renewed call: having received the identity of the radio telephone exchange which can reach the mobile set, the toll exchange sets up an ordinary telephone and radiotelephone link, as if it had to reach a mobile set attached to the said exchange, and this exchange sends out a new call to the mobile set.

2. Guarded call: the radiotelephone exchange guards the path via which it reached the mobile set from an incoming circuit accessible to the incoming switching chain; in addition to its own identity it signals the position in the switching chain of the said incoming circuit to the calling toll exchange; the toll exchange then sets up a telephone link towards this position where it immediately obtains the called set.

3. Nominal call: each mobile set is reached by a terminal position which is assigned to it and which can be put in a busy condition and equipped with a meter (for originating calls).

4. Grouped lines (such as PBX groups): this case may be provided for when it is almost impossible to equip numerous terminal positions towards all mobile sets in a small capacity exchange; or when separate busying of a mobile set in an exchange, or allotting meters in all exchanges of the coverage for every mobile is not required.

5. G-T-G type chain: the inputs of the radiotelephone chain are connected to the terminal outputs of the telephone switch in chain. The radiotelephone chain comprises a switching device which concentrates these inputs on a small group of radiotelephone channels.

6. G-G-T type chain: the inputs of the radiotelephone chain are connected to the outputs of a group stage in the telephone-switching device which links these inputs to the group of radiotelephone channels. This device may comprise a side chain which scatters these same inputs on the terminal positions assigned to the mobile sets to mark their busy condition and to meter their originating communications.

There follows a description of some automatic devices which fulfill various combinations of the instances mentioned above.

Figure 2A:
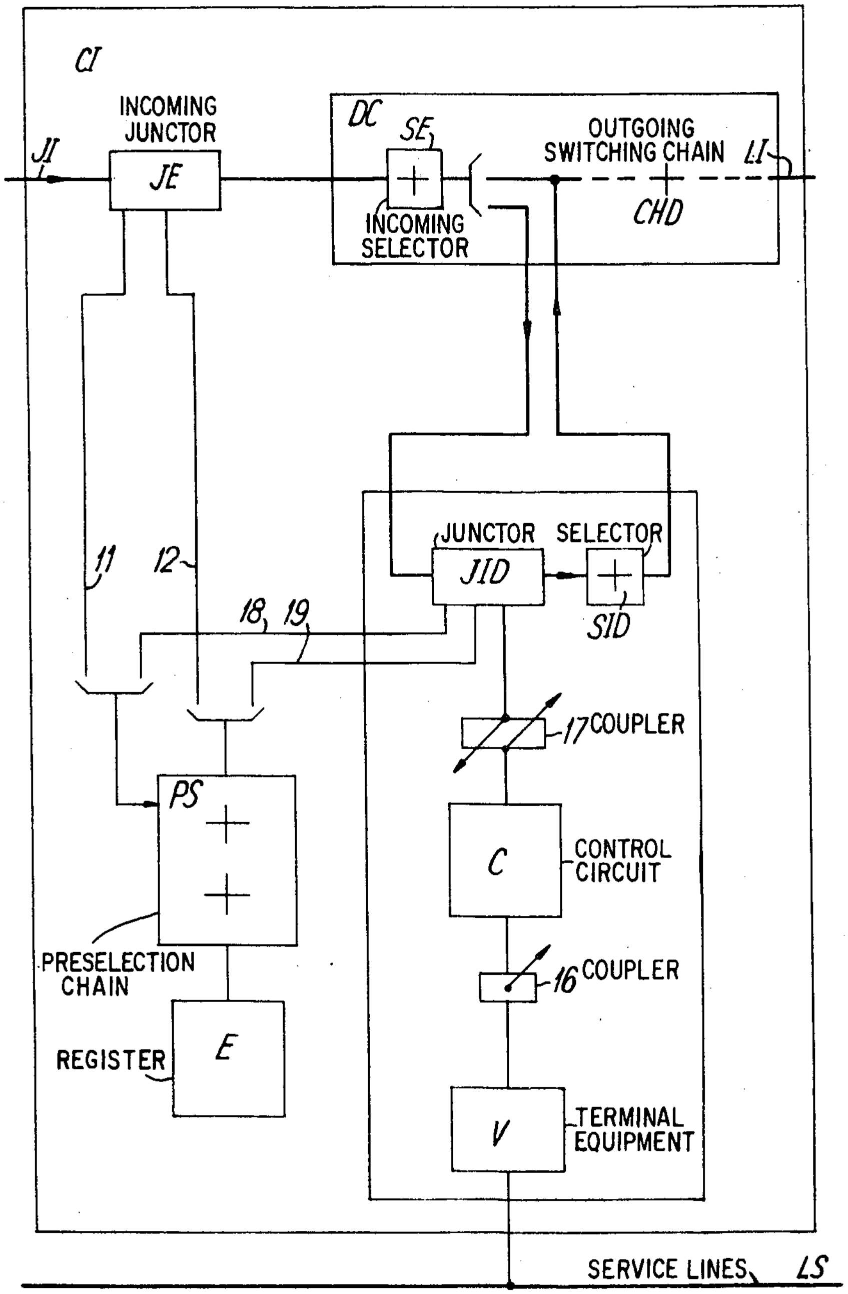

With reference to figure 2*a* CI shows the automatic equipment of a toll exchange which is of exchanges 5 of FIG. 1. This exchange receives toll junctions JI coming from the telephone network it serves. These junctions are equipped with incoming junctors JE which are borne by the inputs of the switching device DC, and more especially by those of the incoming selectors SE. The outputs of these selectors are connected to the outgoing switching chain CHD, the outputs of which bear toll lines LI towards remote telephone exchanges. Junctors JE are connected, on the other hand, to register E by a preselection chain PS. Link 11 between junctors JE and the chain PS is a call link, and line 12 is a connection link. These components form the usual equipment of an exchange CI, in the example illustrated.

Figure 2B:
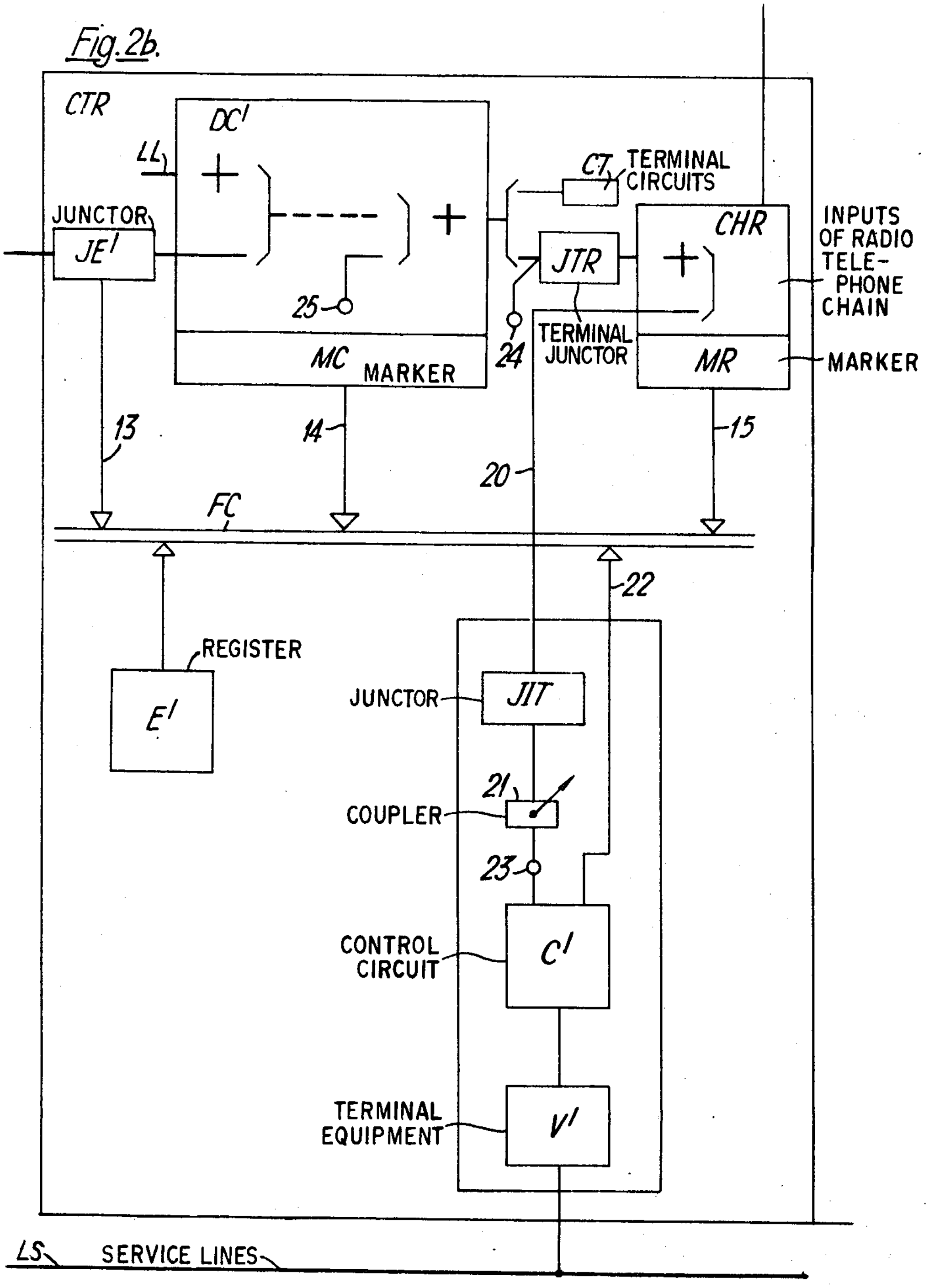

Referring now to FIG. 2*b*, CTR represents the automatic equipment of a radiotelephone exchange which is one of the exchanges 2 of FIG. 1. This equipment comprises a switching device DC' the inputs of which bear local lines LL and trunks lines LI, which are equipped with junctors JE'. It is assumed that this device is controlled by a marker MC and that registers E' can be interconnected, by means of a connecting bundle FC (as in the well known "PENTACONTA" system), on the one hand by link 13, to junctors JE', and on the other hand, via link 14, to marker MC. The outputs of switching device DC' bear the terminal circuits CT of local lines and the terminal junctors JTR for the mobile sets, for nominal calls to mobile sets via a G-T-G type chain (see above). These junctors JTR are borne, on the one hand, by the inputs of the radiotelephone chain CHR. This chain comprises a switching device which concentrates the separate terminal positions of the mobile sets on several radiotelephone channels. It is assumed that this chain is also controlled by a marker MR, which the register E' reach via connecting bundle FC and link 15.

In this system, the switching device reaches a terminal position JTR according to the directory number of the mobile set, then the radiotelephone chain broadcasts the said number, suitably translated into a radiotelephone call number. The number of the mobile set is thus used twice, whereas in a telephone call it is only used to reach terminal position CT. Three means of repeating the number going out to the radiotelephone chain can be mentioned.

(1) by translating the number of the terminal position of junctor JTR, where a nominal call is concerned (see above).

(2) by transferring the number, from register E' to chain CHR, via connection path E'-JE'-DC'-JTR-CHR and (3) by transferring the number, register E' to chain CHR, via control path E'-MR-CHR (or MC-MR-CHR, if the register has already transferred the number to marker MC), the two latter means do not involve a definite relation between terminal position JTR and the mobile set number.

To come back to toll exchange CI, shown in FIG. 2*a*, the equipment added to fulfill the requirements of the invention comprises junctors JID borne by several outputs of incoming selectors SE. These junctors can be connected to service line LS (i.e. line 7 in FIG. 1) via a chain comprising the terminal equipment V of line LS in toll exchange CI, via coupler 16, several control circuits C and a coupler 17. They can also be connected to registers E like junctors JE, through a call link 18 and a connection link 19. On the output side of the telephone connection path, junctors JID are borne by the inputs of a selector SID similar to incoming selectors SE. The outputs of this selector are connected to the further portion of the switching chain (outgoing chain CHD) as are selector SE outputs.

When register E receives a number beginning with a code which designs a mobile set (or a call receiver), it establishes a connection between calling junctor JE and junctor JID, via selector SE which bears junctor JE. Junctor JID seizes a control circuit C, which takes equipment V, which, in its turn, seizes line LS (or a channel in this line, if there are several). Via connection path E-PS-12-JE-SE-JID-17-C, the register transfers the called number to the control circuit. The control circuit releases the register while maintaining incoming connection JI-JE-SE-JID, and transfers the number to terminal equipment V which sends it out along line LS to all the radiotelephone exchanges in the system, with its own identity, if necessary. Once the number has been sent out, terminal equipment V remains in watching position on the line (or channel) it has seized.

To come back to the radiotelephone exchange CTR, shown in FIG. FIG. 2*b* the equipment added for the requirements of the invention, in the modification described here, comprises a group of junctors JIT which are connected, via links 20, to suitable positions in the radiotelephone chain CHR. These positions may be input positions like those bearing terminal junctors JTR, or group positions, as depicted in the drawing. Junctors JIT can be connected to service line LS by means of a chain comprising terminal equipment V' of line LS in the exchange CTR, a control circuit C' and a coupler 21. Control circuit C' can be connected, on the other hand to the radiotelephone chain via link 22, connecting bundle FC and link 15 to marker MR, for controlling chain CHR as does register E', or marker MC, as the case may be.

Terminals V' are always in watching position. They all receive, then, the number sent out by exchange CI. This number is is transferred to circuit C', together with the identity of the calling exchange, if required. Circuit C' seizes junctor JIT and establishes a radiotelephone link JIT-20-CHR by seizing a radiotelephone path in chain CHR. It then transfers the called number to the said chain by similar means to those provided for calls originating locally, as stated above. To this end, control as stated above. To this end, control circuit C' can mark junctor JIT as it takes up the terminal position assigned to the called number, or it can transfer the number called by connection C'JIT-20-CHR, or by control link C'-22-FC-15-MR-CHR. The radiotelephone chain broadcasts this number.

It must be understood that the called number may be subject to various conversions, translations, codings and decodings between register E in the toll exchange and broadcasting over the radiotelephone channel. The call number broadcasted only comprises (in its form at this stage) that part of the called number necessary for the selecto-call of the called mobile set (or call receiver).

If the radiotelephone exchange receives no reply (if the mobile set is not within its area, or where a call receiver is concerned) it clears itself. In the exchange which receives the reply from the mobile set (i.e., the usual acknowledgment of receipt) the control circuit receives a signal and controls the addressing of reply information via terminal V' to the calling toll exchange. In the modification described herein, this information minimally comprises the identity of the answering exchange (toll code number). It may also comprise the called number.

Naturally, this information may be suitably translated or coded.

In the calling toll exchange, the reply information is transferred to control circuit C. This circuit sends a signal to junctor JID, which seizes a register E by the above described means (call link 18, chain PS, connection link 19). The control circuit then transfers the information to the register by path C-17-JID-19-PS-E.

The service line can be cleared immediately the control circuit has received the reply information.

In the register E, the reply information is recorded in the usual form of a subscriber number in the remote answering exchange, defined by its toll code number. The register sets up a telephone link as it would were it to start from the incoming junctor JE: junctor JID and selector SID are controlled as junctor JE and selector SE would be, then chain CHD is controlled as in the case of an ordinary link. In remote exchange CTR, the telephone link reaches junctor JTR which is assigned to the called mobile set and seizes a path in chain CHR. The called number is transferred to this chain by one of the means stated above. Chain CHR broad casts this number. It is assumed that the said chain again reaches the mobile set. The establishing of the radiotelephone link then continues using the usual means provided for links (set replies, is rung, and conversation follows).

In a modification which applies to grouped lines (see above), junctors JTR are not individually assigned to mobile sets, but are borne by a group of terminal positions which switching device DC' can reach by automatic hunting in this group. In chain CHR, the junctions coming from these junctors can be regarded as being like junction 20 coming from junctors JIT. In the control device of switching device DC' (in marker MC, for instance), the called number, which is received from the remote toll exchange, is translated into the number common to group JTR, and one junctor JTR is seized. Following this, the said called number is transferred to the radiotelephone chain by the means stated above. For instance, if this number has to be defined by an assigned terminal position, junctor JTR would be marked as junctor JIT was marked by control circuit C' as described above.

If this number were to be transferred by the connection path or by the control path, this transfer could be effected by a free junctor or by a junctor which could be assigned to this number.

In another modification, control circuit C' is connected to terminal junctors JTR, via a suitable link between outputs 23 of circuits C' and inputs 24 of junctors JTR, where grouped lines are concerned, the operation is identical. For nominal cases, two modifications are provided for. In one modification, junctors JTR receive additional means to transfer, not the subscriber's number which is defined by their terminal position (if this is the case) to the radiotelephone chain but the number transferred by control circuit C'. These additional means are not necessary if the number is transferred independently from the terminal position, as described above. In another modification, link 23—24 forms a selection chain which enables control circuit C' to be connected to junctor JTR which is assigned to the called number. In this case, the established connection can be guarded by the said junctor and by a radiotelephone path, as will be described here after with reference to FIG. 3. This modification is such that control circuit C' is able to recognize whether or not the mobile set is available, free or busy, from junctor JTR which is assigned to this set.

In another modification, control circuit C' is connected to trunks or links 25 in the switching device, so as to reach, either any JTR junctor, or the junctor JTR assigned to the called set. This illustrates the possibility of adapting the link system according to the invention to highly varied trunk diagrams.

With reference, now, to FIG. 3 comes the description of equipment whereby a call can be guarded (see above). In this equipment junctors JIT each have three paths, as do junctors JID in FIG. 2. Incoming connections 26 connect then to the terminating outputs of switching device DC. Output connections 20 are connected to the inputs of chain CHR as are the outputs of junctors JTR. Apart from these special details, the general diagram resembles the one shown in FIG. **2*b***.

The difference in the operational method lies in the fact that junctor JIT and the established path in chain CHR for transmitting the number of the called mobile set remain guarded after the said set has replied. Connection JIT-CHR preferrably remains in a ready-to-ring state. Moreover, the reply information directed to the calling toll exchange comprises, in this case, in addition to the identity of the answering exchange, the identity of the terminal position bearing junctor JIT, translated into the number of a dummy subscriber. The toll exchange establishes, then, a telephone link so as to reach the said dummy subscriber, and junctor JIT is reached in this way. In this junctor, the telephone link is linked up to the guarded path in chain CHR, and the called mobile set is, in this way, reached reliably and rapidly. The ringing signal can then be sent out to him immediately.

As in FIG. **2*b* a modification can be effected in which control circuit C' seizes a junctor JTR, instead of a special junctor JIT. This brings us back to the modification described, with reference to FIG. 2*b* where link 23—24** is provided.

Finally, with reference to FIG. 4 there follows a description of equipment adapted to operate a guarded call in a case where the chain is of G-G-T type (see above). The drawing shows separately groups selection stages SG and terminal selection stages STL (in the ordinary telephone chain which reaches terminal circuits CT of local subscribers). Portions SG and STL of the switching device are connected, as usual by means of internal trunks or links 27. Other trunks or links 28 going out from stages SG are connected, in the radiotelephone chain, to a switching device SR. This device comprises a so-called Y-selector stage SY, which effects double connections between their inputs and outputs in two groups. One group of outputs is connected via junction 29 to radiotelephone channels in a radiotelephone device proper RT. The other group of outputs is connected to a stage of terminal selectors STR the outputs of which bear terminal circuits CTM each one of which is assigned to a mobile set. This arrangement has been described in French Pat. No. 1,497,524, filed on May 26, 1966 for "An Automatic Mobile Radio Telephone Network" in the same name as the present application.

The input of junctors JIT is connected as shown in FIG. 3, to terminal positions of the telephone-switching device, to wit, to terminal outputs STL (trunks 26). Output 30 of these junctors is connected, via a coupler 31, to the inputs of chain SR (to trunks 28 in the diagram).

In this device, the control circuit seizes a junctor JIT and starting from this junctor, seizes a double path via chain SR. One branch of this path comprises a radiotelephone channel in device RT. The other branch comprises a terminal selection stage and reaches the terminal circuit CTM assigned to the called set. This circuit may be provided with the usual parts for counting and marking the busy condition. This double path is guarded after the mobile set has replied. The reply information signalled to the calling toll exchange again comprises the identity of the answering exchange and the identity of the terminal position, in stage STL, which bears junctor JIT (i.e., the number of the dummy subscriber which is assigned to this position). The toll exchange establishes a telephone link which reaches this terminal position and junctor JIT. In the said junctor, the telephone path is linked up to the guarded path in devices SR and RT. The ringing signal can be sent out immediately, as described with reference to FIG. 3.

It will be noted that in the radiotelephone communication system according to the invention, some radiotelephone exchanges can be equipped to effect renewed calls, and others, to make calls over the guarded path. These two operational procedures are compatible, and the same toll exchanges can work in cooperation with the two types of radiotelephone exchanges.

While the principles of the invention have been described above in connection with specific apparatus and applications, it is to be understood that this description is made only by way of example and not as a limitation on the scope of the invention.

We claim:

1. A radiotelephone communication system between telephone networks served by toll exchanges and mobile telephone sets over a geographical area covered by a plurality of radiotelephone exchanges connected over a distance to said toll exchanges; said system comprising: a service information transmission link releasably connected between toll exchanges and radiotelephone exchanges; means for connecting said transmission link in parallel with an outgoing switching chain in each of the toll exchanges and with an incoming switching chain in each of the radiotelephone exchanges; means for signalling the call number of a called mobile set via said transmission link from a calling toll exchange to all the radiotelephone exchanges; means, in said exchanges, for broadcasting this number via a radiotelephone chain; means for transmitting switching information from that radiotelephone exchange which receives a reply from called mobile set to the calling toll exchange by said service link; and, means in said calling toll exchange for extending thereupon the telephone link by the outgoing switching chain of said calling toll exchange towards the answering exchange and via the incoming switching chain and the radiotelephone chain in said radio exchange.

2. A radiotelephone communication system between telephone networks served by toll exchanges and mobile telephone sets over a geographical area covered by a plurality of radiotelephone exchanges connected over a distance to said toll exchanges; said system comprising: a service information transmission link releasably connected between toll exchanges and radiotelephone exchanges; means for connecting said transmission link in parallel with an outgoing switching chain in each of the toll exchanges and with an incoming switching chain in each of the radiotelephone exchanges; means for signalling the call number of a called mobile set via said transmission link from a calling toll exchange to all the radiotelephone exchanges; means, in said exchanges, for broadcasting this number via a radiotelephone chain; means in each the toll exchanges for connecting said transmission link to a toll exchange junctór having access to the outgoing switching chain; means in the radiotelephone exchanges for connecting said service link to a radiotelephone exchange junctor accessible from the incoming switching chain for connecting this last junctor to an input of the radiotelephone chain and for guarding in the last said chain an established path for reaching the mobile set, after a called mobile set has replied; and means for extending the telephone link from said junctor in the toll exchange via the outgoing switching chain in this toll exchange and the incoming switching chain in the answering radiotelephone exchange up to said junctor in said radiotelephone exchange, and finally, via the guarded path in the radiotelephone chain.

3. A radiotelephone system according to claim 2 in which said toll exchange junctor similar to the incoming junctors, which is borne by is coupled to an output level of incoming selectors; and the outputs of said toll exchange junctor are connected to the further portion of the switching chain as are the outputs of the incoming selectors.

4. A system according to claim 2, in which said radio telephone exchange junctor is coupled to a terminal output position of the telephone-switching chain; and the switching information transmitted by said radiotelephone exchange to the toll exchange comprises the identity of the terminal position.

5. A system according to claim 4, in which the radiotelephone chain is reached by a group selection stage of the telephone-switching chain and comprises a telephone terminal selection stage, the output of said radiotelephone exchange junctor is connected to an input of this radiotelephone chain so that the extended telephone link continues after said selection stage, via the telephone terminal selection stage, then by said radiotelephone exchange junctor, and from there by said terminal selection stage in the radiotelephone stage.

6. A system according to claim 2, in which the guarded path in the radio telephone chain is guarded in a ready-to-ring condition, and in which the ringing signal is sent to the mobile set as soon as the extended telephone link is connected to this path.

7. A system according to claim 1 in which means are provided for releasing the service link between the toll exchanges and the radiotelephone exchanges after the mobile set has sent out the call number when said number is assigned to a simple call receiver.